US007577410B2

(12) United States Patent
Kato

(10) Patent No.: US 7,577,410 B2
(45) Date of Patent: Aug. 18, 2009

(54) AUDIO APPARATUS

(75) Inventor: Takeshi Kato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1090 days.

(21) Appl. No.: 11/098,769

(22) Filed: Apr. 4, 2005

(65) Prior Publication Data

US 2005/0232431 A1 Oct. 20, 2005

(30) Foreign Application Priority Data

Apr. 5, 2004 (JP) ............................ 2004-111176

(51) Int. Cl.
*H04B 1/18* (2006.01)

(52) U.S. Cl. ............. 455/161.1; 455/161.2; 455/575.1; 455/434

(58) Field of Classification Search ............. 455/161.1, 455/161.2, 575.1, 188.1, 142–143, 552, 553, 455/434, 437; 375/216, 260, 267
See application file for complete search history.

(56) References Cited

U.S. PATENT DOCUMENTS 6,591,100 B1 * 7/2003 Dent ......................... 455/434
7,194,753 B1 * 3/2007 Fries et al. .................... 725/38

FOREIGN PATENT DOCUMENTS

| | | |
|---|---|---|
| JP | 2002-300057 | 10/2002 |
| JP | 2003-046883 | 2/2003 |
| JP | 2003-229778 | 8/2003 |

* cited by examiner

*Primary Examiner*—Tony T Nguyen
(74) *Attorney, Agent, or Firm*—Brinks Hofer Gilson & Lione

(57) ABSTRACT

An audio apparatus is provided that permits selection of either analog or digital audio signals in execution of a scan operation. A radio receiver 300 comprises a tuner 320 capable of receiving carrier wave signals including at least an analog audio signal and a digital audio signal, a microcomputer 380 for controlling the tuner to search for a receivable broadcast station in sequence, and to receive the carrier wave signal from the broadcast station searched for during a certain period of time, a switch 350 for selecting one audio signal from the analog audio signal and the digital audio signal sent from the tuner 320 during the scan operation, and a speaker 390 for reproducing the audio signal selected by the switch 350.

20 Claims, 3 Drawing Sheets

EXAMPLE OF USER'S INPUT SETTINGS

| TYPE OF BROADCASTING | SETTING |
|---|---|
| ANALOG BROADCASTING | 1 |
| IBOC BROADCASTING | 1 |

| OUTPUT | SETTING |
|---|---|
| ANALOG SIGNAL | 1 |
| DIGITAL SIGNAL | 0 |

EXAMPLE OF USER'S INPUT SETTINGS

| TYPE OF BROADCASTING | SETTING |
|---|---|
| ANALOG BROADCASTING | 0 |
| HYBRID BROADCASTING | 1 |
| ALL-DIGITAL BROADCASTING | 0 |

| TYPE OF BROADCASTING | SETTING |
|---|---|
| ANALOG BROADCASTING | 0 |
| HYBRID BROADCASTING | 0 |
| ALL-DIGITAL BROADCASTING | 1 |

AUDIO APPARATUS

BACKGROUND OF THE INVENTION

1. Field of the Invention

The present invention relates to an audio apparatus capable of receiving analog radio broadcasting and digital radio broadcasting. More particularly, the invention is directed to control of a function of searching for a receivable broadcast station in sequence, of receiving carrier wave signals from the broadcast station searched for by a tuner for a certain period of time, and further of repeatedly performing a search operation for a next broadcast station (hereinafter referred to as a scan function or scan operation).

2. Description of the Related Art

Radios built in audio apparatus or audio systems have a scan function. The execution of the scan function allows a user to find a receivable broadcast station. Also, interruption of a scan operation enables reception of the user's favorite broadcasting.

The so-called preset function has been utilized which involves pre-registering broadcast stations in a memory, and scanning the registered broadcast stations. For example, JP-A-5-122016 discloses sound equipment with a tuner and a tape player integrated therein that automatically scans through channels stored in the memory when a preset-scan switch is turned on, regardless of whether a tuner switch is turned on or off, thus improving end operability for the users.

Although most of the radio broadcasting services transmitted from the broadcast stations use analog signals, terrestrial digital audio broadcasting (hereinafter referred to as In-Band On-Channel (IBOC)) has been put to practical use in the U.S.A. in recent years. The IBOC systems may be either hybrid or all digital. In the hybrid system, analog broadcasting coexists with digital broadcasting with the same contents at the same center frequency. In the all-digital system, only the digital broadcasting exists. These systems can provide broadcasting with high sound quality without being affected by a reception environment, such as a multipath, as compared to the existing analog systems.

For example, JP-T-2001-520479 discloses a radio broadcasting system that is designed to normally receive digital broadcasting of high quality in the case of reception of the radio broadcasting through the hybrid system, but to switch the reception to that of analog broadcasting automatically when the digital broadcasting cannot be received well due to deterioration of the reception environment, thereby providing audio outputs in a seamless manner with respect to changes in the reception environment.

In the radios that receive the analog broadcasting, an interval from when a frequency is switched to another to when audio outputs are provided is short. For this reason, even when the scan operation is carried out, the contents of the broadcasting from the receivable broadcast stations can be listened to at regular time intervals in sequence, so that a desired broadcast station may be selected comfortably.

In the digital radio broadcasting, however, since time interleaving for improvement in multipath resistance and transmission of encoded audio signals is performed to enhance the reception quality, a processing time is needed for decoding. An interval from when the center frequency is received to when the audio signals are reproduced is relatively long, as compared to the existing FM or AM broadcasting. Thus, in the case of the reception of the broadcasting through the hybrid system, analog audio of the analog broadcasting, whose synchronizing time is short, is generally reproduced from the radio just after switching the reception frequency, and then digital audio of the digital broadcasting is automatically reproduced from the radio after ensuring the digital broadcasting synchronization, thus permitting the user to implement the radio without uncomfortable feeling or annoyance, as is the case with the known FM/AM radios.

Therefore, the scan operation suitable for use in the hybrid broadcasting or IBOC broadcasting, which is different from the conventional FM/AM radio broadcasting, is required. FIG. 6 is an explanatory diagram illustrating a reception situation in which the scan operation is carried out with the analog broadcasting coexisting with the hybrid broadcasting. As shown in the figure, when an analog broadcast station A is searched for or retrieved by scan 1, the analog audio signals are reproduced from the radio during an interval T. Next, when an IBOC broadcast station B (hybrid broadcasting) is searched for by scan 2, the analog audio signals are reproduced during an initial interval TA, and then the digital audio signals are reproduced during a next interval TD. Subsequently, when an analog broadcast station C is searched for by the next scan 3, the analog audio signals are reproduced during an interval T. As mentioned above, in the reception of the hybrid broadcasting, the analog audio signals coexist with the digital audio signals. The digital audio outputs are superior in audio quality to the analog audio outputs. However, when the audio quality is changed during a series of scan operations due to switching from the analog to the digital audio outputs, the user may feel uncomfortable or be annoyed. Further, the scan function is for the user to understand the contents of broadcasting provided by the broadcast station, not necessarily to pursue excellent audio quality or acoustic effect.

SUMMARY OF THE INVENTION

The present invention has been accomplished so as to solve those problems encountered with the prior art, and it is an object of the invention to provide an audio apparatus that permits selection of either analog or digital audio signals in execution of a scan operation.

According to one aspect of the invention, there is provided an audio apparatus that comprises a tuner capable of receiving carrier wave signals including at least an analog audio signal and a digital audio signal, a scan controller for controlling the tuner to search for a receivable broadcast station in sequence, to receive the carrier wave signal from the broadcast station searched for during a certain period of time, and to repeatedly perform the search and reception, a selecting section for selecting one audio signal from the analog audio signal and the digital audio signal sent from the tuner, during a scan operation, and a speaker for reproducing the audio signal selected by the selecting section.

In the audio apparatus of the invention, either one of the analog audio signal and the digital audio signal can be selected during the scan operation, thereby eliminating switching of sound quality during the scan operation without causing the user to feel uncomfortable and annoyance.

BRIEF DESCRIPTION OF THE DRAWINGS

FIG. 3 illustrates a table in an example of user's settings in a scan operation;

FIG. 5 illustrates a table in another example of user's settings in another scan operation.

DESCRIPTION OF THE PREFERRED EMBODIMENTS

An audio apparatus according to the invention will be preferably applied to a car audio apparatus or a car audio system using the same. Now, the details of the car audio system will be given with reference to the accompanying drawings.

Preferred Embodiments

Figure 1:
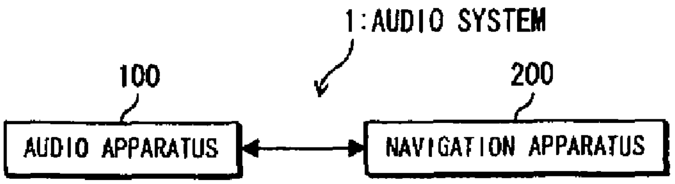
FIG. 1 is a diagram showing the configuration of an audio system according to one preferred embodiment of the invention.

FIG. 1 illustrates an example of the configuration of a car audio system according to a first preferred embodiment of the invention. The car audio system 1 includes an audio apparatus 100 and a navigation apparatus 200. The audio apparatus 100 has a function of receiving radio broadcasting as well as a function of reproducing music data stored in a CD, a DVD, a hard disk, or the like. The navigation apparatus 200 has a navigation function of searching for a guidance route to a destination and of guiding a vehicle along the guidance route. The audio apparatus 100 and the navigation apparatus 200 are interconnected with each other, and can share a storage medium, such as the hard disk, and a display with each other.

Figure 2:
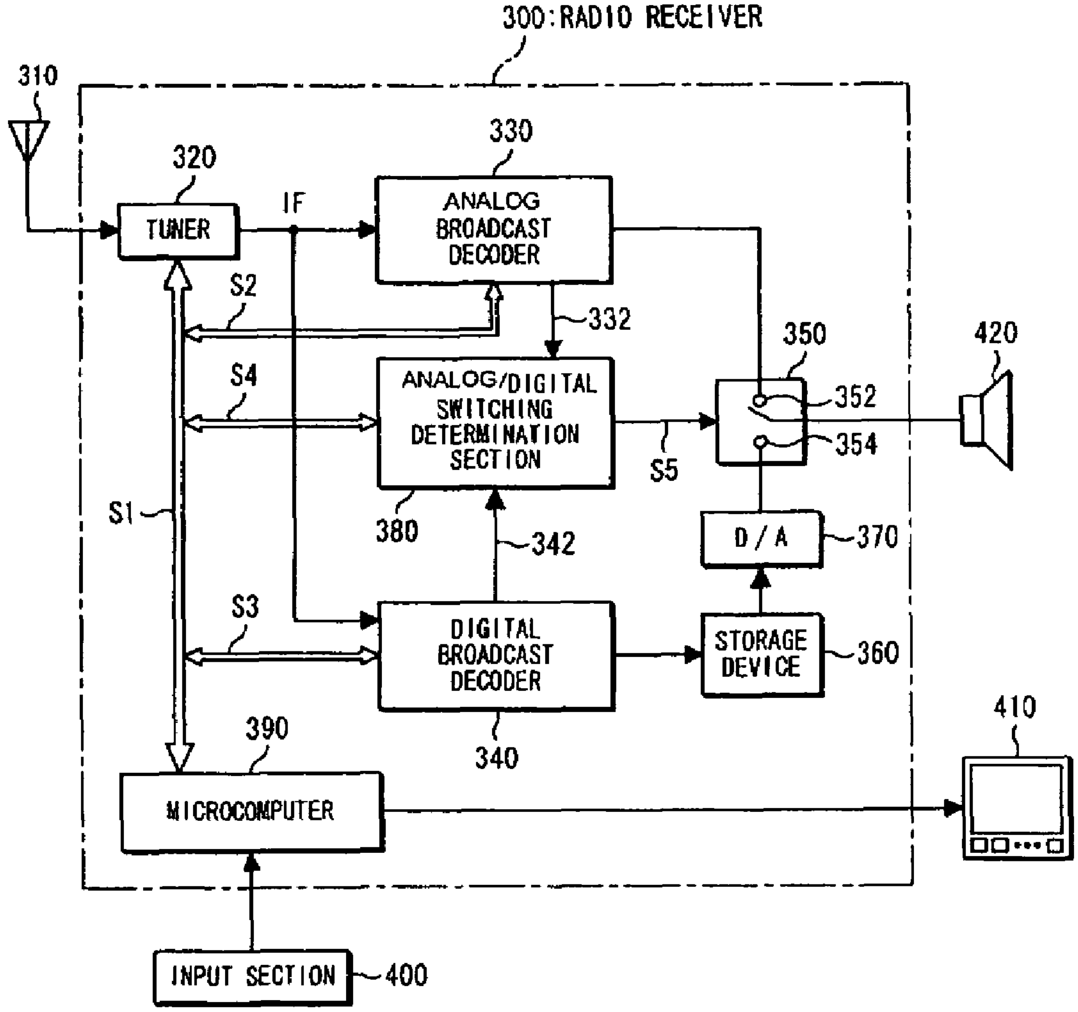
FIG. 2 is a block diagram showing the configuration of a radio receiver according to the embodiment.

FIG. 2 illustrates a block diagram of the configuration of a radio receiver included in the audio apparatus 100. A radio receiver 300 of the first embodiment has a function of receiving hybrid broadcasting of the IBOC broadcast system. As mentioned above, in the IBOC broadcast system, the analog audio signals coexist with the digital audio signals at the same center frequency. In this system, a carrier wave of the analog audio signal has wave bands on both sides thereof utilized for the digital audio signal.

The radio receiver 300 includes an antenna 310 for receiving radio broadcasting, a tuner 320 connected to the antenna 310, an analog broadcast decoder 330 and a digital broadcast decoder 340 that receive intermediate frequency (IF) sent from the tuner 320, a switch 350 for coupling the analog audio signal decoded by the analog broadcast decoder 330 to a first input terminal 352, a storage device 360 for storing therein the digital audio signal decoded by the digital broadcast decoder 340, and a digital/analog (D/A) converter 370 for converting the digital audio signal read from the storage device 360 into the analog audio signal to send it to a second input terminal 354 of the switch 350. The radio receiver further includes an analog/digital switching determination section 380 for receiving a reception quality signal 332 sent from the analog broadcast decoder 330 and a reception quality signal 342 sent from the digital broadcast decoder 340, and for sending a switching control signal S5 for control of switching between the analog and digital audio outputs at the switch 350 based on the reception quality signals 332 and 334, and a microcomputer 390 for controlling each component. The microcomputer 390 includes a memory for storing therein a program and data required for control of each component.

The microcomputer 390 transmits and receives control data S1 to and from the tuner 320. The tuner 320 tunes in to a broadcast station, and conducts a scan operation in response to the control data S1. The control data S1 includes control data S2 and S3 for controlling the analog broadcast decoder 330 and the digital broadcast decoder 340, and control data S4 for controlling the analog/digital switching determination section 380.

The control data S2 includes control of the analog broadcast decoder 330, which involves, for example, turning on/off thereof. The control data S3 includes control of the digital broadcast decoder 340, which involves, for example, turning on/off thereof. The control data S4 controls the switch 350 in such a manner that the analog audio is fixedly sent from the switch 350 during the scan operation. In other words, the switching control signal S5 causes the first input terminal 352 of the switch 350 to send the audio therefrom. On the other hand, at the time of reception of the normal radio broadcasting other than the time of the scan operation, the analog/digital switching determination section 380 controls the switch 350 in such a manner that one of the analog and digital audio signals, whichever has better reception quality, is reproduced, based on the reception quality signals 332 and 334. Further, the analog/digital switching determination section 380 sends the control data S4 about whether the radio broadcasting received by the antenna 310 is the analog broadcasting, the digital one, or the hybrid one, to the microcomputer 390 based on the reception quality signals 332 and 342.

The switch 350 sends the audio signal via any one of the first terminal 352 and the second terminal 354 in response to the switching control signal S5, as mentioned above. The outputs of the switch 350 are coupled to the speaker 420 via an amplifier (not shown) or the like.

Further, the microcomputer 390 is connected to an input section 400, from which various kinds of instructions given by the user are entered. Concretely, instructions to perform a scan operation, to set the type of the broadcast station in execution of the scan operation, and to set the type of audio signals to be received can be provided. For example, the user's inputs are kept in tables shown in FIG. 3. In a table of FIG. 3(*a*), which broadcasting (analog broadcasting and/or IBOC broadcasting) should be subjected to the scan operation is set. The numeric character "1" means that the scan operation is valid, while the numeric character "0" means that the scan operation is invalid. This example shows that the analog broadcasting and the IBOC broadcasting (including the hybrid broadcasting and the all-digital broadcasting) are of interest to be scanned.

In a table of FIG. 3(*b*), which audio signal (analog audio signal or digital audio signal) should be reproduced from the speaker upon the scan operation is set. This example of the table shows that the analog audio signal is set to be reproduced from the speaker. It should be noted that the input section 380 may be shared between the audio apparatus 100 and the navigation apparatus 200.

The microcomputer 390 is connected to a display 410, on which desired data may be displayed. The display 410 may be shared between the audio apparatus 100 and the navigation apparatus 200.

Now, the scan operation performed by the ratio receiver of the first preferred embodiment will be described below with reference to a flowchart of FIG. 4. In this embodiment, a plurality of broadcast stations, that is, the analog broadcasting and the IBOC broadcasting coexist.

First, when an instruction to perform the scan operation is given or inputted by a user, the microcomputer 390 causes the tuner 320 to tune in to a receivable broadcast station so as to search for the broadcast station (step S110). When a signal level of the tuner 320 exceeds a predetermined value, the microcomputer 390 determines that the receivable broadcast station is searched for or retrieved (step S102).

Then, the microcomputer 390 determines whether or not reception of the only digital audio signal is set by the user, with reference to the table of FIG. 3(*b*) (step S103). If the reception of the only digital audio signal is set, the microcomputer 390 may turn off the analog broadcast decoder 330 by the control data S2, and may render the digital broadcast decoder 340 operable by the control data S3.

Subsequently, the microcomputer 390 checks or identifies whether or not the signal being received during a certain period of time is the IBOC signal (signal through hybrid broadcasting system) (step S104). This identification is performed based on the presence or absence of the reception quality signal 342 from the digital broadcast decoder 340. That is, if data output, namely, the reception quality signal 342 is provided from the digital broadcast decoder 340 within a certain period of time, the reception of the IBOC signal is identified or confirmed.

When the reception of the IBOC signal is identified, the microcomputer 390 couples the outputs of the switch 350 to the second input terminal 354 by the switching control signal S5. The IF signal from the tuner 320 is subjected to digital processing, such as decoding, at the digital broadcast decoder 340, and then temporarily stored in the storage device 360 to be synchronized. Thereafter, the IF signal synchronized is converted into an analog audio signal by the D/A converter 370 to be reproduced from the speaker 420. Thus, the reception of the digital audio signal is carried out (step S105).

If the reception of the IBOC signal is not identified at the step S104, the broadcasting being received is determined to be analog broadcasting. Then, the microcomputer 390 causes the tuner 320 to search for another broadcast station.

After the reception of the digital audio signal continues for a certain period of time, the microcomputer 390 causes the tuner 320 to search for a next broadcast station (step S106).

In contrast, if the reception of the only digital audio signal is not set by the user at the step S103, that is, if reception of the analog audio signal is set, the IF signal is sent from the tuner 320 to the analog broadcast decoder 330 and the digital broadcast decoder 340. The microcomputer 390 selects the first input terminal 352 by the switching control signal S5, causing the speaker 390 to produce the analog audio signal (step S107).

Subsequently, the microcomputer 390 checks or identifies whether or not the signal being received during a certain period of time is the IBOC signal (step S108). This identification can be performed based on the presence or absence of the reception quality signal 342 from the digital broadcast decoder 340. If the IBOC signal is not identified, the analog audio signals are received for a certain period of time (step S106). After the time period has elapsed, another scan through broadcast stations is carried out to search for a next one.

When the IBOC signal is identified (step S108), the microcomputer 390 determines whether or not switching to digital reception is set by the user (step S109). For example, the user can enter from the input section 400 a setting that enables reproduction of the digital audio signal only when receiving the IBOC broadcasting.

As mentioned above, when the switching to the reception of the digital audio signal is available to the user, the microcomputer 390 switches the switch 350 by the switching control signal S5 so as to provide the audio outputs from the second input terminal 354, so that the digital audio signal is received at the receiver (step S110). After the audio outputs are provided during the certain period of time, a search for a next broadcast station is carried out (step S106).

Thus, according to the first embodiment, in the execution of the scan operation, the type of receivable audio signal can be selected by the user, thereby constantly maintaining the quality of the audio during the scan.

That is, in the case of the hybrid broadcasting, the audio outputs are provided and kept in analog format, thereby eliminating the discomfort of changing sound quality for the user, which might be caused by switching from the analog to the digital signals during the scan operation. Particularly, in the AM broadcasting, since the signal quality of the analog signals differs extremely from that of the digital signals, switching from the analog to the digital audio is prevented for several minutes, during which time the audio is generated in the scan operation, thereby eliminating the user discomfort.

Figures 3A, 3B, 4:
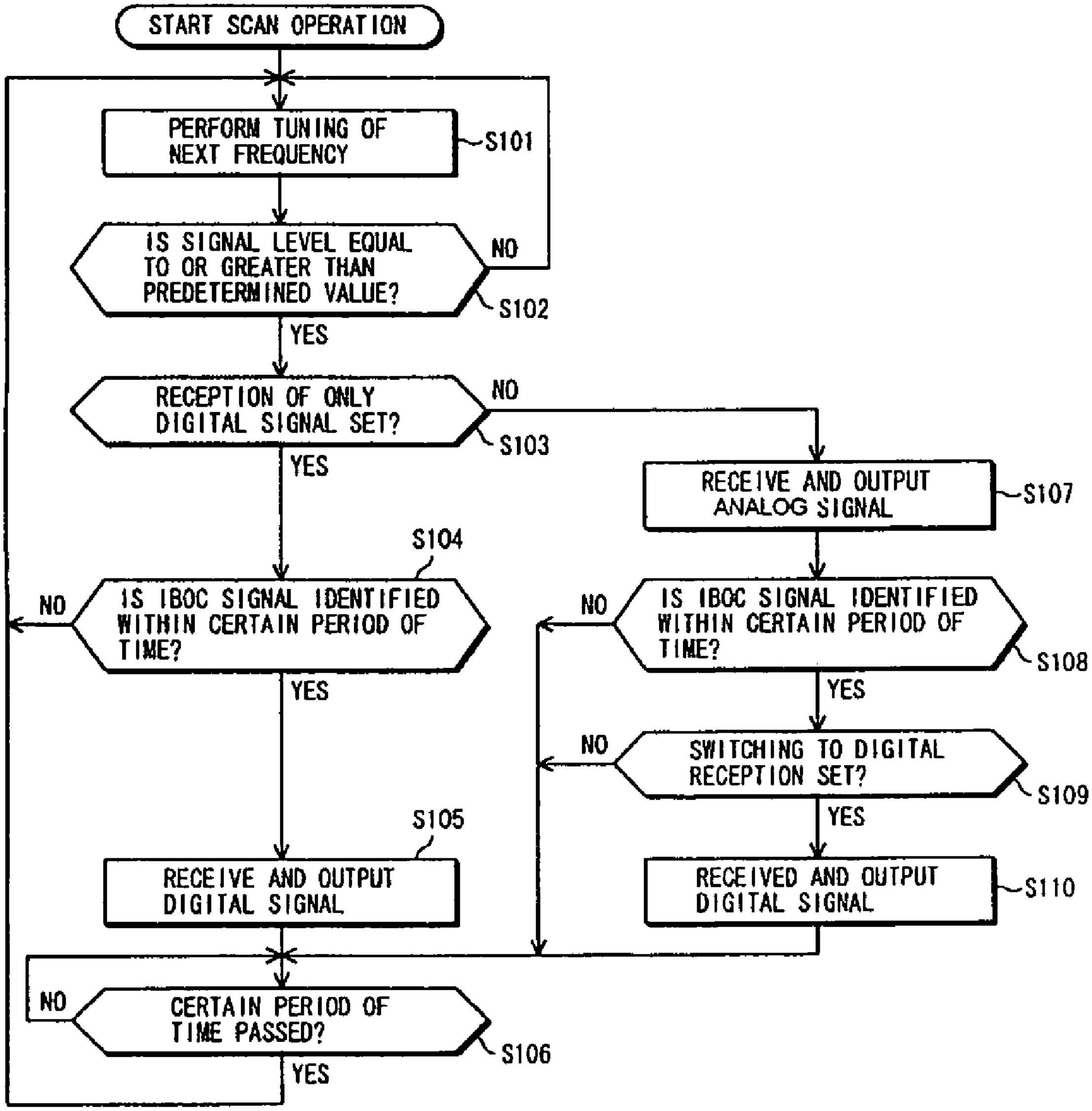
FIG. 4 is a flowchart explaining the scan operation according to the embodiment.

As explained in the flowchart of FIG. 4, the analog audio signals are not necessarily reproduced at first during the scan operation. The digital audio signals may be reproduced based on the user's settings during the scan operation only in the case of IBOC broadcasting. This allows the user to easily understand that the digital broadcasting is being received, when it takes a certain period of time to synchronize the digital signal, thereby permitting the reception of the audio of high quality from the beginning.

Now, a second preferred embodiment of the invention will be described hereinafter. In the first embodiment, in a case where the analog reception is set so as to not switch to the digital reception even when receiving the IBOC signal, the reception and reproduction of only analog signals are performed. In this case, the user cannot identify the reception of the IBOC signal. In the second embodiment, the user is notified of the reception of the IBOC broadcasting by an indicator, beep sound, or the like, while continuously reproducing the analog signals from the audio apparatus.

That is, at the step S108 of FIG. 4, when the IBOC signal is identified, the microcomputer 390 lights up a lamp indicating the IBOC signals being received, on the indicator of the display 410, or produces the beep sound from a speaker on a side of the display 410.

Figures 5A, 5B, 6:
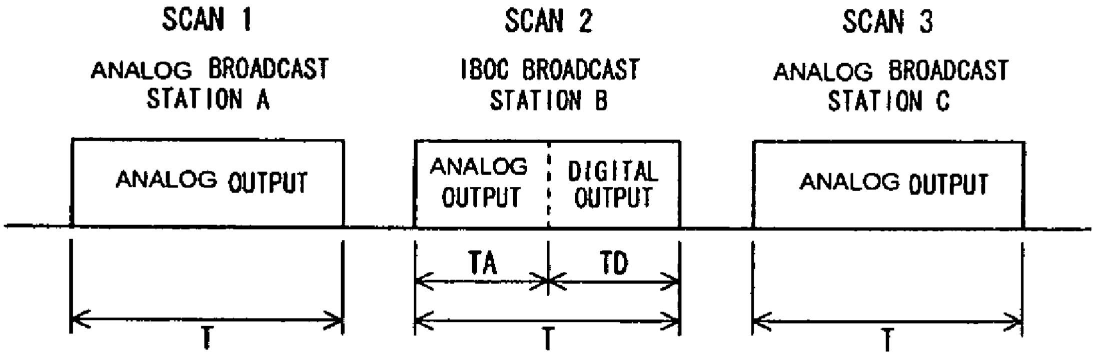
FIG.6 PRIOR ART
FIG. 6 is a diagram explaining problems posed in the execution of a scan operation in a conventional audio apparatus.

It should be noted that although the analog and IBOC broadcasting is of interest to be scanned in the above-mentioned embodiments, only the IBOC broadcasting and not the analog broadcasting may be scanned when the user prefers the digital broadcasting to the analog one. Further, among the IBOC broadcasting, only the broadcasting through the hybrid system may be scanned, or alternatively, only the high-quality broadcasting through the all-digital system may be scanned. For example, in the case of scanning the only hybrid broadcasting, input settings shown in FIG. 5(*a*) are saved, while, in the case of scanning the only all-digital broadcasting, input settings shown in FIG. 5(*b*) are saved.

Furthermore, only the analog broadcast stations may be scanned through based on the user's settings. This is effective especially when the user already knows that a desired broadcast station offers the analog broadcasting. In this case, a channel of the analog broadcast station may be preset.

Although the preferred embodiments of the invention have been described in details, the invention is not limited thereto. It should be understood that various modifications and variations can be devised by those skilled in the art which fall within the scope and spirit of the appended claims of the invention.

Note that although the audio system has been taken as an example in the above-mentioned embodiments, the invention is not limited thereto. The audio apparatus has only to have a function of receiving at least radio broadcasting, and may also have another function of reproducing the CD, the DVD, or the like. Alternatively, the audio apparatus may be combined with an electronic device, such as a personal computer. The audio apparatus may be a portable audio device, or a home audio device.

The audio apparatus of the invention may be widely applied to the field of electronic device technology, including the car audio system, the car navigation system, a home audio system, and the like.

What is claimed is:

1. An audio apparatus comprising:

a tuner operable to receive a carrier wave signal including at least an analog audio signal and a digital audio signal broadcast from a broadcast station;

a scan controller operable to direct the tuner to search for the carrier wave signal and to receive the carrier wave signal for a certain period of time;

a selecting unit operable to select one audio signal from the analog audio signal and the digital audio signal sent from the tuner during a scan operation; and a speaker for generating the audio signal selected by the selecting unit.

2. The audio apparatus according to claim 1, comprising an input unit operable to receive an instruction entered by a user, wherein the selecting unit is adapted to select one of the analog audio signal and the digital audio signal in response to the instruction entered.

3. The audio apparatus according to claim 2, comprising an indicator operable to indicate that the tuner is capable of receiving the digital audio signal when the analog audio signal is selected by the selecting unit.

4. The audio apparatus according to claim 3, wherein the scan controller directs the tuner to only search for signals including both digital and analog components in response to the instruction sent from the input unit.

5. The audio apparatus according to claim 4, further comprising a preset memory storing data pertaining to the broadcast station that transmits the carrier wave signal including the digital audio signal and the analog audio signal, wherein the scan controller directs the tuner to search for the broadcast station based upon the data stored in the preset memory.

6. The audio apparatus according to claim 5, wherein the carrier wave signal including the digital audio signal and the analog audio signal is an In-Band On-Channel (IBOC) signal.

7. The audio apparatus according to claim 1, comprising an indicator operable to indicate that the tuner is capable of receiving the digital audio signal when the analog audio signal is selected by the selecting unit.

8. The audio apparatus according to claim 7, wherein the scan controller directs the tuner to only search for signals including both digital and analog components in response to an instruction sent from the input unit.

9. The audio apparatus according to claim 7, wherein the signals are In-Band On-Channel (IBOC) signals.

10. The audio apparatus according to claim 1, wherein the scan controller directs the tuner to only search for signals including both digital and analog components in response to an instruction sent from an input unit.

11. A scan control method for searching for a receivable broadcast station, the method comprising directing a tuner to search for a receivable broadcast station, to receive a carrier wave signal including at least an analog audio signal and a digital audio signal broadcast from the receivable broadcast station, and to continue reception of the carrier wave signal for a certain period of time, wherein a scan operation is controlled in such a manner that only one of the analog audio signal and the digital audio signal is reproduced from an audio output device during the scan operation.

12. The scan control method according to claim 11, comprising indicating that the digital audio signal is receivable while the analog audio signal is being reproduced during the scan operation.

13. The scan control method according to claim 11, comprising directing the tuner to search for the carrier wave signal including the digital audio signal and the analog audio signal based upon data pertaining to the receivable broadcast station previously stored in a preset memory.

14. The scan control method according to claim 11, wherein the carrier wave signal including the digital audio signal and the analog audio signal is an In-Band On-Channel (IBOC) signal.

15. The scan control method according to claim 14, comprising searching only for signals including digital and analog components in response to an instruction received from an input unit.

16. A scan control method for searching for a receivable broadcast station, the method comprising:

receiving a first carrier wave signal broadcast from an initial broadcast station, the first carrier wave signal including at least a first analog audio signal and a first digital audio signal;

selecting a type of receivable audio signal to be reproduced by an audio output device during a search for a next broadcast station, the type of receivable audio signal including analog and digital;

searching for the next broadcast station, the next broadcast station broadcasting a second carrier wave signal including at least a second analog audio signal and a second digital audio signal; and reproducing only the type of receivable audio signal selected while searching for the next broadcast station.

17. The scan control method according to claim 16, comprising indicating that the second digital audio signal is receivable while the second analog audio signal is being reproduced by the audio output device.

18. The scan control method according to claim 17, comprising directing the tuner to only search for signals including both digital and analog components.

19. The scan control method according to claim 18, comprising searching for the next broadcast station based upon frequency data stored in a preset memory.

20. The scan control method according to claim 16, comprising searching for only signals including both digital and analog components in response to an instruction received from an input unit.

* * * * *

UNITED STATES PATENT AND TRADEMARK OFFICE

CERTIFICATE OF CORRECTION

PATENT NO. : 7,577,410 B2
APPLICATION NO. : 11/098769
DATED : August 18, 2009
INVENTOR(S) : Takeshi Kato It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1171 days.

Signed and Sealed this

Seventh Day of September, 2010

David J. Kappos

*Director of the United States Patent and Trademark Office*